(12) United States Patent
Shimada et al.

(10) Patent No.: US 9,105,280 B2
(45) Date of Patent: Aug. 11, 2015

(54) REPRODUCTION APPARATUS AND REPRODUCTION METHOD

(75) Inventors: Kenichi Shimada, Yokohama (JP); Toshiki Ishii, Yokohama (JP); Motoyuki Suzuki, Yokohama (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 293 days.

(21) Appl. No.: 13/085,870

(22) Filed: Apr. 13, 2011

(65) Prior Publication Data

US 2012/0050831 A1     Mar. 1, 2012

(30) Foreign Application Priority Data

Sep. 1, 2010 (JP) ................. 2010-195278

(51) Int. Cl.
*G03H 1/26* (2006.01)
*G11B 7/08* (2006.01)
*G11B 7/0065* (2006.01)

(52) U.S. Cl.
CPC ............... *G11B 7/083* (2013.01); *G03H 1/26* (2013.01); *G11B 7/0065* (2013.01)

(58) Field of Classification Search
CPC ....... G03H 1/265; G03H 1/28; G03H 1/0486; G03H 2001/2292
USPC ............... 359/10, 11, 32, 35; 369/103, 112.1, 369/112.15
See application file for complete search history.

(56) References Cited

U.S. PATENT DOCUMENTS

| | | |
|---|---|---|
| 2006/0215529 A1 | 9/2006 | Uno et al. |
| 2007/0236765 A1* | 10/2007 | Jung ............................... 359/11 |
| 2008/0094998 A1* | 4/2008 | Jeong et al. .................... 369/103 |
| 2008/0252953 A1 | 10/2008 | Lan et al. |

FOREIGN PATENT DOCUMENTS

| | | |
|---|---|---|
| EP | 1 596 375 A2 | 11/2005 |
| JP | 2001-118253 | 4/2001 |
| JP | 2004-272268 | 9/2004 |

OTHER PUBLICATIONS

European Search Report issued in European Patent Application No. 11 162 622.2 dated May 10, 2012.

* cited by examiner

*Primary Examiner* — Audrey Y Chang
(74) *Attorney, Agent, or Firm* — McDermott Will & Emery LLP

(57) ABSTRACT

In a holographic memory of an angle multiple recording system, when a hologram is reproduced, a light beam of a different polarizing direction is irradiated as reference light to a hologram recording medium and diffracted light is detected from the hologram recording medium.

17 Claims, 6 Drawing Sheets

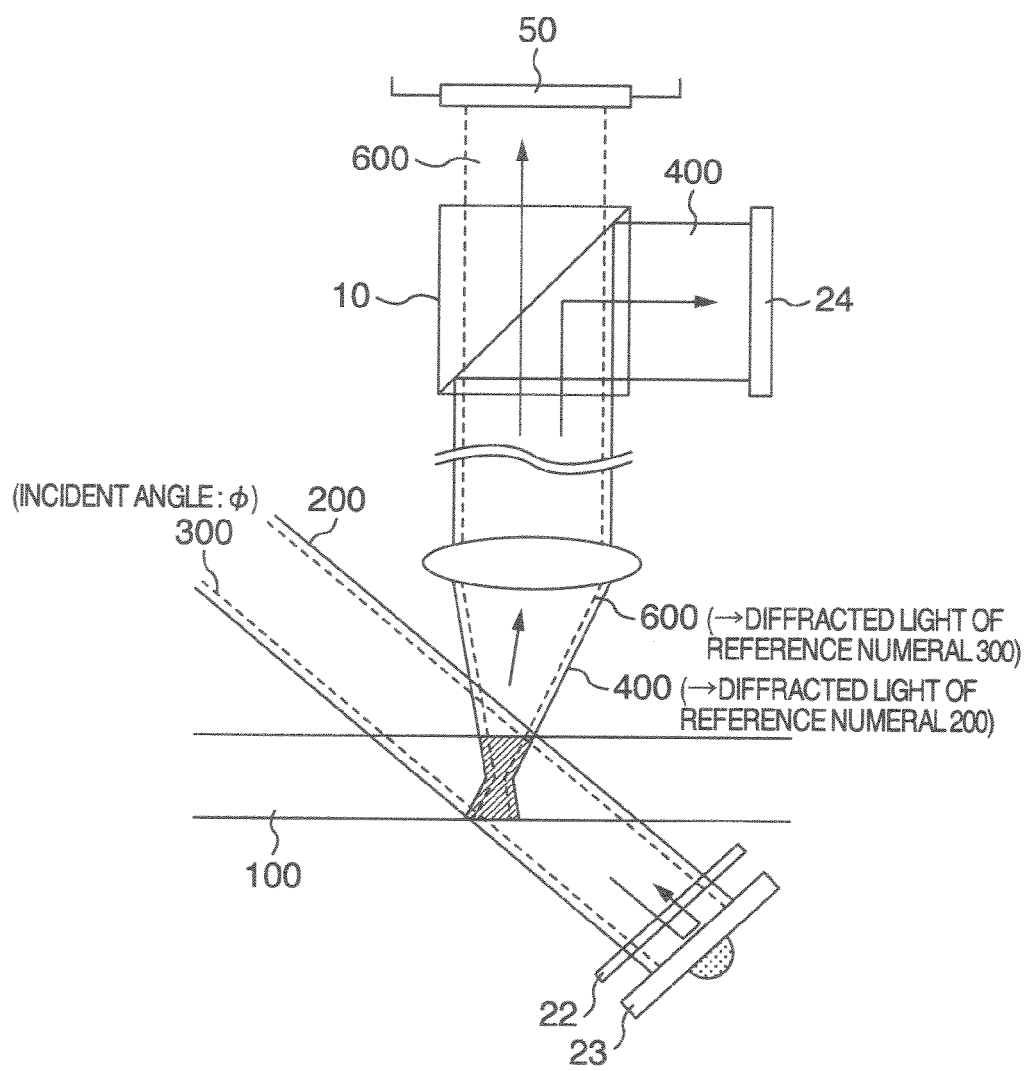

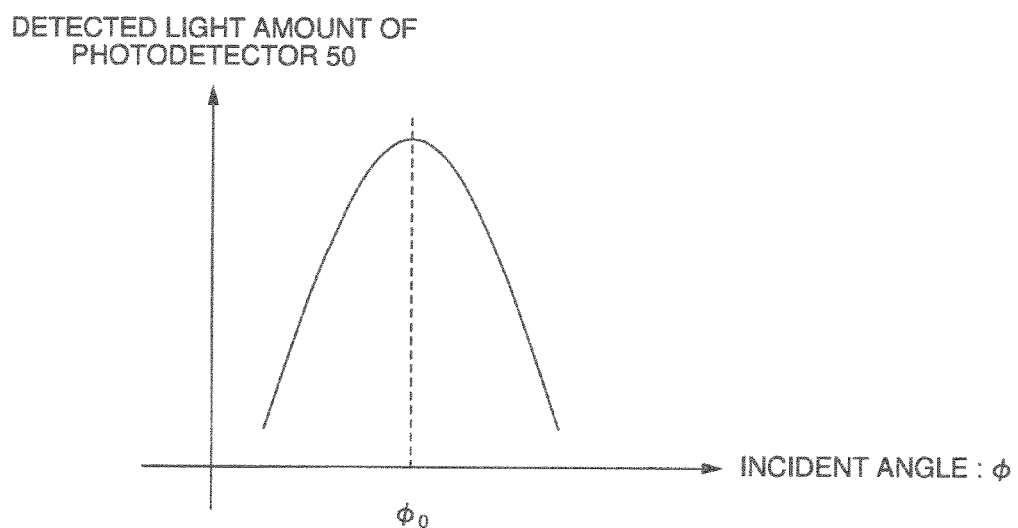
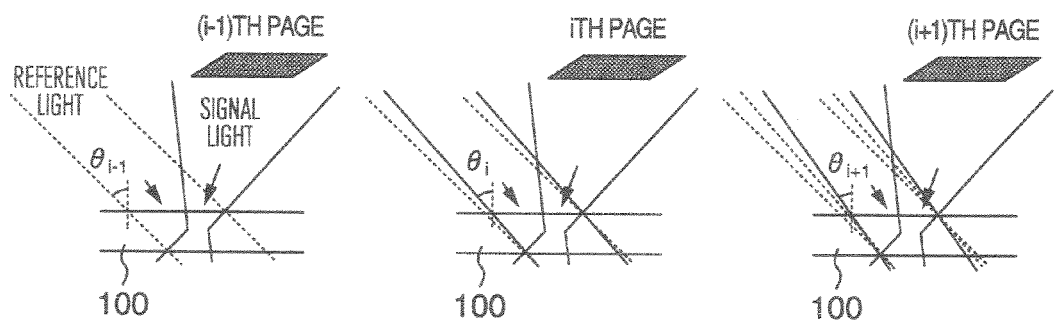

REPRODUCTION APPARATUS AND REPRODUCTION METHOD

INCORPORATION BY REFERENCE

The present application claims priority from Japanese application JP-2010-195278 filed on Sep. 1, 2010, the content of which is hereby incorporated by reference into this application.

BACKGROUND OF THE INVENTION

Field of the Invention

The invention relates to a reproduction apparatus and a reproduction method for reproducing information from a hologram recording medium.

At present, an optical disc having a recording capacity of about 50 GB has commercially been put into practical use owing to the Blu-ray Disc (BD) standard using a blue violet semiconductor laser or the like. In a light storage field, an expectation to an optical disc having a large recording capacity of about 100 GB to 1 TB similar to that of an HDD (Hard Disc Drive) will be rising in future.

However, in order to realize such a large capacity by an optical disc, a new storage technique different from a trend of a high density technique in the related art based on the realization of a short wavelength and a high NA of an objective lens so far is necessary.

In the recent research regarding a light storage technique of the next generation, attention is paid to a hologram recording technique of recording digital information by using holography.

The hologram recording technique is such a technique that signal light having information of page data which has two-dimensionally been modulated by a space light modulator and reference light are overlaid in a recording medium and a refractive index modulation is caused in the recording medium by an interference fringe pattern which occurs at that time, thereby recording the information.

Upon reproduction of the information, if the reference light used upon recording is irradiated to the recording medium by the same layout, the hologram recorded in the recording medium acts like a diffraction grating, so that diffracted light occurs. The diffracted light is reproduced as the same light including the recorded signal light and phase information.

The reproduced signal light is two-dimensionally detected at a high speed by using a photodetector such as CMOS, CCD, or the like. As mentioned above, in the hologram recording, since the two-dimensional information is simultaneously recorded/reproduced by one hologram and a plurality of page data can be overwritten to the same location, it is effective to the recording and reproduction of information of a large capacity and a high speed.

As a hologram recording technique, for example, there is JP-A-2004-272268 (Patent Document 1). JP-A-2004-272268 discloses what is called an angle multiple recording system constructed in such a manner that a signal light flux is converged to a light information recording medium by a lens, at the same time, reference light of the parallel light flux is irradiated and interfered to thereby record a hologram, and further, different page data is displayed to a space light modulator while changing an incident angle of the reference light to the light recording medium, thereby performing a multiple recording.

For example, JP-A-2001-118253 (Patent Document 2) discloses a method whereby an incident angle of reference light is controlled so that a detection intensity of diffracted light reaches a maximal value. An abstract of JP-A-2001-118253 discloses "Signal light 4 which holds data information by space polarization distribution is recorded as a hologram onto a light recording medium 10 which can record a polarizing direction by reference light 5. Upon reading out, diffracted light 6 is read out by irradiating the reference light 5 to the light recording medium 10, diffracted light 8R is detected by a photodetector 43 for monitoring, and an irradiation angle of the read-out light 5 is controlled so that its detection intensity reaches a maximal value or a predetermined value. An S polarization component 9S and a P polarization component 9P of diffracted light 7 which is obtained in this state are detected by photodetector arrays 45S and 45P, thereby reading data information.".

SUMMARY OF THE INVENTION

In the angle multiple recording system, when reproducing a hologram, a tolerance to the incident angle of the reference light is severe. For example, by an influence of a medium contraction upon recording or by an influence of a contraction, an expansion, a refractive index change, or the like of the medium due to a temperature change between the recording and the reproduction, a proper angle condition of the reference light upon reproduction does not always coincide with that upon recording.

According to Patent Document 2, the diffracted light is read out by irradiating the reference light to the light recording medium, the diffracted light is detected by the photodetector for monitoring, and the irradiation angle of the reference light is controlled so that its detection intensity reaches the maximal value or the predetermined value. However, according to Patent Document 2, in order to search for a point where the detection intensity of the diffracted light becomes the maximal value, a time required to previously scan the angle of the reference light and find out the maximal value is additionally necessary, so that it becomes an obstacle to the realization of a high speed.

It is, therefore, an object of the invention to detect a proper incident angle of reference light at a high precision and at a high speed.

In consideration of the above problem, according to the invention, for example, a light beam whose polarizing direction differs from that of the reference light is irradiated to a hologram recording medium and diffracted light from the hologram recording medium is detected.

According to the invention, the proper incident angle of the reference light can be detected at a high precision and at a high speed.

Other objects, features and advantages of the invention will become apparent from the following description of the embodiments of the invention taken in conjunction with the accompanying drawings.

BRIEF DESCRIPTION OF THE DRAWINGS

FIG. 3 is a schematic diagram showing a state where a light beam is irradiated to a hologram recording medium upon reproduction of the holographic memory apparatus.

FIG. 4 is a schematic diagram showing a relation between an incident angle of control light and a detected light amount.

FIGS. 5A to 5C are schematic diagrams illustrating a state of an angle multiple recording.

DETAILED DESCRIPTION OF THE INVENTION

Embodiments of the invention will be described hereinbelow.

Embodiment 1

Figure 1:
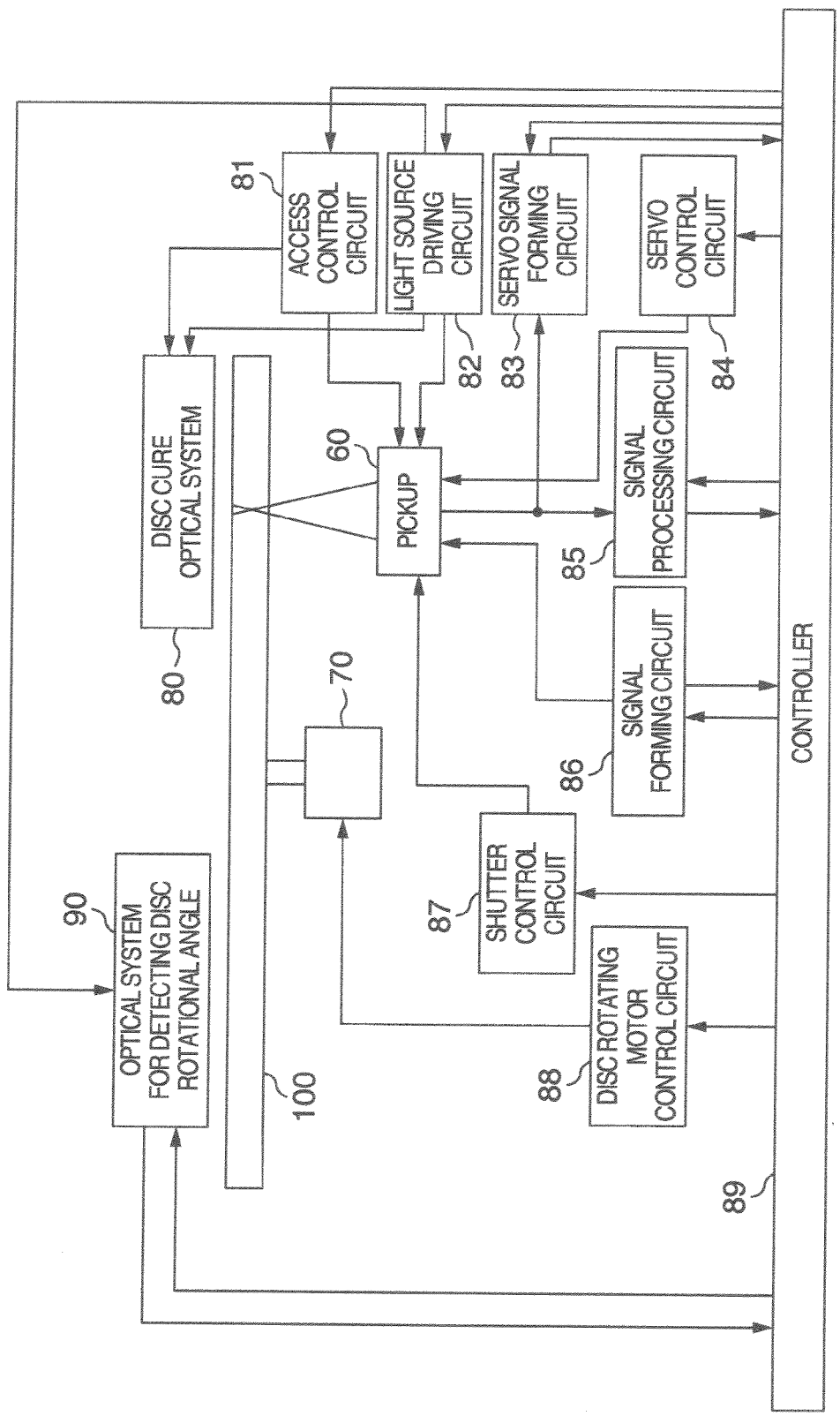
FIG. 1 shows a whole configuration of a holographic memory apparatus.
Figure 2:
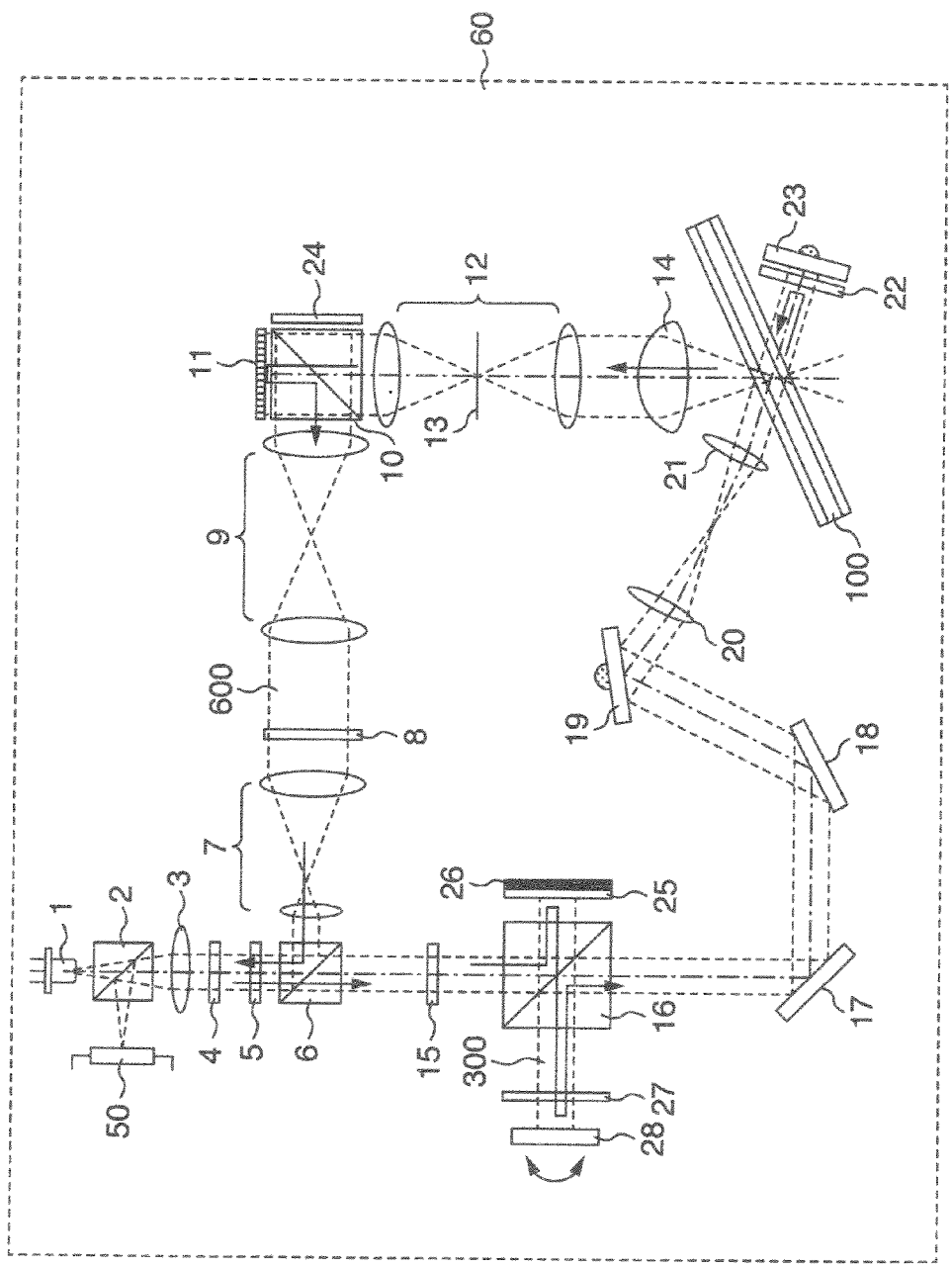
FIG. 2 shows an embodiment of an optical system of the holographic memory apparatus.

First, an example of a whole configuration of an apparatus in the embodiment will be described. FIG. 1 shows a whole configuration of a holographic memory apparatus for recording and/or reproducing digital information by using holography. The holographic memory apparatus has: an optical pickup device 60 having a configuration as illustrated in FIG. 2; a disc cure optical system 80; an optical system 90 for detecting a disc rotational angle; and a rotating motor 70. A hologram recording medium 100 can be rotated by the rotating motor 70.

The optical pickup device 60 plays a role for emitting reference light and signal light to the hologram recording medium 100 and recording digital information by using the holography.

At this time, an information signal to be recorded is sent to a space light modulator in the optical pickup device 60 by a controller 89 through a signal forming circuit 86. The signal light is modulated by the space light modulator.

In the case of reproducing the information recorded in the hologram recording medium 100, it is reproduced by using phase conjugate light of the reference light. The phase conjugate light is a light wave which progresses in the opposite direction while keeping the same wave front as that of the input light. The reproduction light which is reproduced by the phase conjugate light is detected by an image pickup device 24 in the optical pickup device 60 and the signal is reproduced by a signal processing circuit 85.

An irradiation time of each of the reference light and the signal light which are irradiated to the hologram recording medium 100 can be adjusted by controlling an opening/closure time of a shutter 4 in the optical pickup device 60 by the controller 89 through a shutter control circuit 87.

The disc cure optical system 80 plays a role for forming a light beam which is used for a precure and a postcure of the hologram recording medium 100. The precure denotes such a prestep that when information is recorded to a desired position in the hologram recording medium 100, a predetermined light beam is preliminarily irradiated before the reference light and the signal light are irradiated to the desired position. The postcure denotes such a poststep that after the information was recorded to the desired position in the hologram recording medium 100, a predetermined light beam is irradiated to the desired position in order to disable an over-writing thereto.

The disc rotational angle detecting optical system 90 is used to detect the rotational angle of the hologram recording medium 100. In the case of adjusting the hologram recording medium 100 to a predetermined rotational angle, a signal corresponding to the rotational angle is detected by the disc rotational angle detecting optical system 90 and the rotational angle of the hologram recording medium 100 can be controlled by using the detected signal by the controller 89 through a disc rotating motor control circuit 88.

A predetermined light source drive current is supplied from a light source driving circuit 82 to a light source in each of the optical pickup device 60, disc cure optical system 80, and disc rotational angle detecting optical system 90. A light beam of a predetermined light amount can be emitted from each of the light sources.

A mechanism which can slide a position in the radial direction of the hologram recording medium 100 is provided for the optical pickup device 60 and the disc cure optical system 80 and their position control is made through an access control circuit 81.

Since the recording technique using the holography is a technique which can record high density information, for example, there is such a tendency that a permissible error to an inclination or a positional deviation of the hologram recording medium 100 is extremely small. Therefore, as shown in the embodiments 1 and 2, a mechanism for controlling the incident angle of the reference light or a mechanism for detecting a deviation amount of a deviation factor of a small permissible error such as inclination or positional deviation of the hologram recording medium 100 is provided in the optical pickup device 60, and a servo mechanism for forming a signal for servo control by a servo signal forming circuit 83 and correcting the deviation amount through a servo control circuit 84 is provided in the holographic memory apparatus.

As for the optical pickup device 60, disc cure optical system 80, and disc rotational angle detecting optical system 90, some of their optical system configurations or all of them may be simplified by collecting into one configuration.

FIG. 3 is a schematic diagram showing a light beam which is irradiated to the hologram recording medium 100 when the page data is reproduced from the information recorded hologram recording medium 100 in the holographic memory apparatus in the embodiment. As illustrated in FIG. 3, in the embodiment, reference light 200 and control light (light for controlling) 300 are irradiated to the hologram recording medium 100 on which the page data has been recorded. Polarizing directions of the reference light 200 and control light 300 cross perpendicularly each other.

Since the polarizing directions of the reference light 200 and control light 300 cross perpendicularly each other, among diffracted light which is diffracted from the hologram recording medium 100, a polarizing direction of first diffracted light 400 which is generated by the reference light 200 and a polarizing direction of second diffracted light 600 which is generated by the control light 300 also cross perpendicularly each other. Therefore, for example, by arranging a polarized beam splitter 10 in front of the image pickup device 24 for detecting the hologram reproduction image, the first diffracted light 400 and the second diffracted light 600 can be separated. If the reference light 200 and the control light 300 are away from each other so that they can be sufficiently separated, it is not always necessary that the polarizing directions of those two light cross perpendicularly.

In the embodiment, an incident angle $\phi$ of the control light 300 to the hologram recording medium 100 can be controlled independent of the incident angle of the reference light 200. The control light 300 is irradiated to the hologram in which the page data to be reproduced has been recorded. The incident angle of the control light 300 is discretely or continuously changed. A light amount of the diffracted light 600 which is diffracted from the hologram recording medium 100 is detected by a photodetector 50. An incident angle $\phi_0$ of the control light 300 at which the detected light amount becomes a peak value as shown in FIG. 4 is detected. As a detecting method of the incident angle $\phi_0$ of the control light 300 at which the detected light amount becomes the peak value, for example, a method whereby the sampled detected light amounts are fitted to a curve by a predetermined function and a maximal value among them is used may be used, or a method whereby a threshold value is provided and the incident angle at which the detected light amount exceeds the threshold value is used may be used. In such a case, by keeping the light amount of the control light 300 which enters the hologram recording medium 100 constant, a fluctuation of the detected light amount can be reduced. Therefore, a detection precision is improved.

If a plurality of page data has been recorded in the hologram recording medium 100 by the angle multiple system, in order to avoid an influence by the adjacent pages of the page to be reproduced, a width of scanning range at the time of discretely or continuously changing the incident angle mentioned above is set to a predetermined value or less. For example, upon recording, when the page data of the ith page which has been recorded at an incident angle $\theta_i$ of the reference light as shown in FIG. 5B is reproduced, assuming that incident angles at which the adjacent pages have been recorded are respectively equal to $\theta_{i-1}$ and $\theta_{i+1}$ as shown in FIGS. 5A and 5C, the width of scanning range of the incident angle mentioned above is set to a value smaller than $|\theta_{i-1} - \theta_{i+1}|$. For example, by setting as mentioned above, a possibility of detecting the intensity peak of the diffracted light by the adjacent pages can be remarkably reduced and the influence by the adjacent pages can be avoided.

When the control light 300 is irradiated to the hologram recording medium 100 at the incident angle $\phi_0$, the intensity of the diffracted light which is diffracted from the hologram recording medium 100 becomes the peak value. Therefore, the incident angle of the reference light 200 is set to $\phi_0$ and the page data is reproduced by the image pickup device 24.

FIG. 2 is a schematic diagram illustrating a state of propagation of the control light 300 in the holographic memory apparatus upon reproduction. A light beam emitted from a laser light source 1 is transmitted through a polarized beam splitter 2, a collimator lens 3, and the shutter 4 and enters a polarizing direction converting element 5. The polarizing direction converting element 5 changes a polarizing state of the light beam so that the light beam of a desired light amount can pass through a polarized beam splitter 6. The polarizing direction of the light beam which was transmitted through the polarized beam splitter 6 is changed by a polarizing direction converting element 15 and the light beam is branched to the reference light 200 and the control light 300 by a polarized beam splitter 16. In FIG. 2, the light beam which was transmitted through the polarizing direction converting element 15 and, thereafter, is transmitted through the polarized beam splitter 16 is assumed to be the reference light 200, and the light beam which was transmitted through the polarizing direction converting element 15 and, thereafter, is reflected by the polarized beam splitter 16 is assumed to be the control light 300.

In this case, the light amount of the reference light 200 is reduced as compared with the light amount before it is transmitted through the polarized beam splitter 16. Since the reference light is used to detect each pixel of the 2-dimensional page data of high quality, a large intensity is necessary. Therefore, it is desirable to separate the light beam so that a ratio of the light amount of the reference light 200 to the light amount of the control light 300 is equal to, for example, about 9:1 or 8:2. On the other hand, for example, the light amount of the light beam emitted from the laser light source 1 may be set to be larger than the light amount of the reference light upon recording. However, the invention is not limited to such examples.

After a progressing direction of the control light 300 reflected by the polarized beam splitter 16 was folded back by a reflecting surface constructed by a quarter-wave retardation plate 25 and a mirror 26, the control light 300 is transmitted through the polarized beam splitter 16. The control light 300 which was transmitted through the polarized beam splitter 16 is folded back by a reflecting surface constructed by a quarter-wave retardation plate 27 and a variable mirror 28 and is reflected by the polarized beam splitter 16. In the embodiment, the variable mirror 28 is used in order to enable the incident angle $\phi$ of the control light 300 to be controlled independent of the incident angle of the reference light 200. In the embodiment, an angle scanning range of the reflecting surface of the variable mirror 28 may be narrower than an angle scanning range of a galvano mirror 19, which will be described hereinafter, because it is sufficient that the incident angle $\phi$ of the control light 300 can be scanned only by a predetermined amount. Therefore, the angle of the reflecting surface of the variable mirror 28 can be scanned at a high speed by controlling, for example, a piezo element, an acousto-optical scanner element, an electro-optical scanner element, or the like.

By using such an optical system configuration, the polarizing directions of the reference light 200 and control light 300 can be made to cross perpendicularly. The reference light 200 and control light 300 whose polarizing directions cross perpendicularly enter the hologram recording medium 100 through a mirror 17, a mirror 18, the galvano mirror 19, a lens 20, and a lens 21.

The embodiment uses the configuration in which the diffracted light of the light which is transmitted through the hologram recording medium 100, passes through a quarter-wave retardation plate 22 and a galvano mirror 23, and enters the hologram recording medium 100 again is detected. The diffracted light 600 of the control light 300 is transmitted through an objective lens 14, a relay lens 12, a space filter 13, and the polarized beam splitter 10.

For example, a space light modulator 11 is set to ON to all pixels, that is, it is set so that the polarizing direction is rotated by 90° to all of the pixels in such a manner that the diffracted light 600 reflected by the space light modulator 11 is reflected by the polarized beam splitter 10. Generally, since the number of pixels which are ON in the page data that is recorded is equal to about 50% of all of the pixels at most, in other words, about the half of the pixels in the page data are OFF, an amount of light whose polarizing direction is rotated by 90° by the space light modulator 11 upon recording is equal to about the half. Since the light whose polarizing direction was rotated by 90° by the space light modulator 11 is reflected by the polarized beam splitter 10 and propagates to the photodetector 50, in the embodiment, the number of pixels which are set to ON upon reproduction is set to be larger than the number of pixels which are set to ON upon recording. Thus, utilization efficiency of light can be improved.

The diffracted light 600 reflected by the space light modulator 11 is transmitted through the relay lens 9, a phase mask 8, and a relay lens 7 and is reflected by the polarized beam splitter 6. The diffracted light 600 reflected by the polarized beam splitter 6 is transmitted through the polarizing direction converting element 5, shutter 4, and collimator lens 3 and is reflected by the polarized beam splitter 2. A light amount of the diffracted light 600 reflected by the polarized beam splitter 2 is detected by the photodetector 50.

Since the incident angle of the control light 300 which enters the hologram recording medium 100 can be changed by the variable mirror 28 without exerting an influence on the incident angle of the reference light 200, the incident angle of the control light 300 is scanned by the variable mirror 28 and the incident angle at which the light amount of the diffracted light 600 becomes a peak is detected by using an output value of the photodetector 50.

The diffracted light 400 of the reference light 200 is transmitted through the objective lens 14 and the relay lens 12, is reflected by the polarized beam splitter 10, and is detected by the image pickup device 24 such as CCD, CMOS, or the like. At this time, the incident angle of the reference light 200 which enters the hologram recording medium 100 is set to the incident angle of the control light 300 at which the light amount of the diffracted light 600 mentioned above becomes the peak.

In the embodiment, it is unnecessary that the photodetector 50 is the CCD, CMOS, or the like but, for example, a photodiode or the like with which an optical pickup that is used in a BD drive is equipped can be used as a photodetector 50. Therefore, the light amount can be detected at a high speed and the incident angle at which the light amount of the diffracted light becomes the peak value can be detected at a high speed. Since a response frequency of the image pickup device such as CCD, CMOS, or the like in which pixels are 2-dimensionally arranged is lower than a response frequency of such a photodiode that it is used to detect the signal in a BD, a DVD, or the like serving as an optical disc system in the related art, the image pickup device such as CCD, CMOS, or the like is disadvantageous from a viewpoint of the realization of a high speed.

The disposing position of the photodetector 50 is not limited to the position shown in FIG. 4 but may be any position so long as it is a position where the diffracted light 600 can be detected. For example, it is possible to use such a configuration that the polarized beam splitter is arranged between the objective lens 14 and the polarized beam splitter 10 and the photodetector 50 can detect the control light 300. By such a configuration, since it is unnecessary that the control light 300 is transmitted through the space light modulator 11, the light using efficiency can be further raised.

In the embodiment, the incident angle at which the light amount of the diffracted light becomes the peak value is detected and such a value is set to the incident angle of the reference light. Therefore, if the embodiment is used, the deterioration in reproduction quality can be avoided and the proper incident angle can be detected at a high speed.

In the embodiment, since there is no need to additionally provide the laser light source in order to emit the control light 300, the apparatus can be miniaturized or the costs can be reduced.

When a wavelength of the reference light to be irradiated is slightly merely deviated, the proper angle of the reference light is deviated. Therefore, it is desirable that the reference light 200 and the control light 300 are identical. However, in the embodiment, since the single laser light source is used, a possibility of deviation of the wavelengths of the control light 300 and the reference light 200 can be decreased.

Embodiment 2

Figure 6:
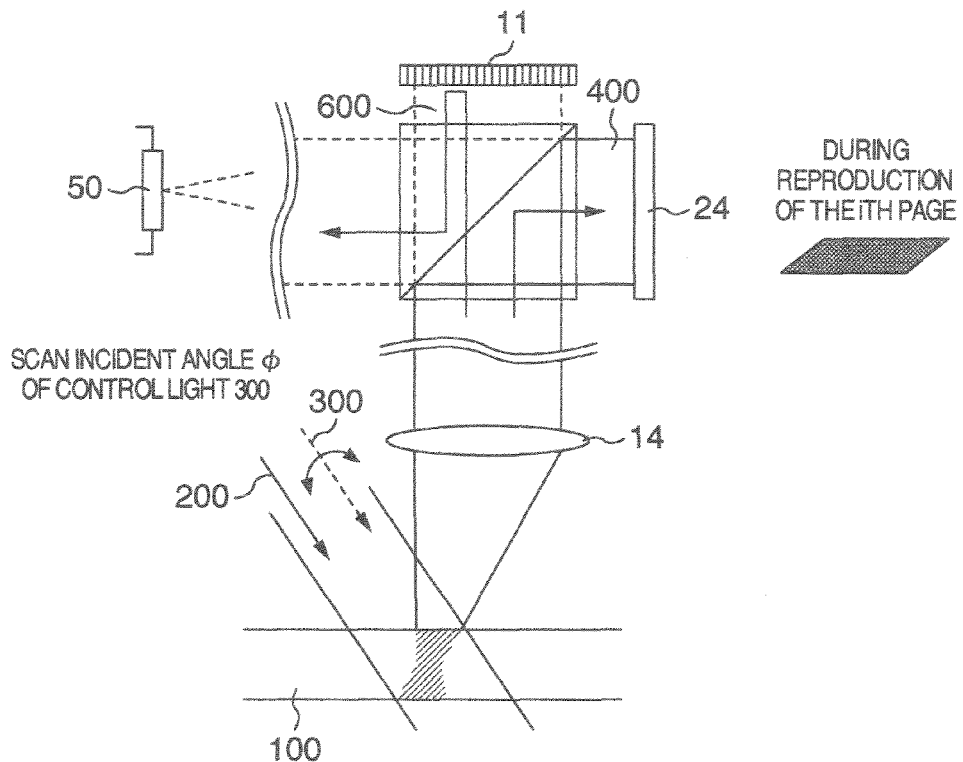
FIG. 6 is a schematic diagram showing a state of reference light and control light upon reproduction of page data of the ith page according to an embodiment 2.

In the holographic memory apparatus in the embodiment, for example, in the case of reproducing the page data in order from the first page, the second page, . . . , the ith page, the (i+1)th page, . . . , the timing when the incident angle at which the light amount of the diffracted light 600 becomes the peak is detected by using the output value of the photodetector 50 may be detected during the reproduction of the page data of the ith page in order to previously obtain the incident angle of the reference light 200 for reproducing the page data of the (i+1)th page. Details will be described hereinbelow with reference to FIG. 6.

Figure 7:
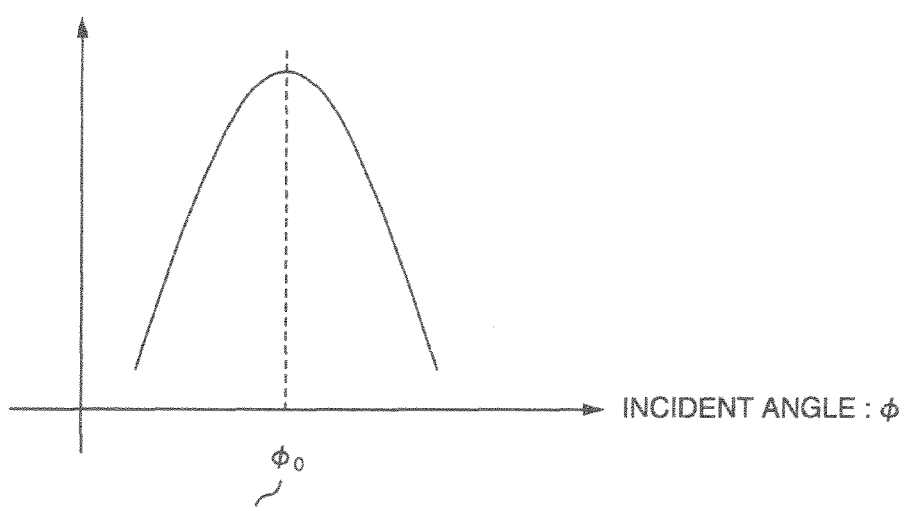
FIG. 7 is a schematic diagram showing a relation between an incident angle of the control light and a detected light amount upon reproduction of the page data of the ith page according to the embodiment 2.

As mentioned above, the reference light 200 and control light 300 whose polarizing directions cross perpendicularly enter the hologram recording medium 100. The incident angle of the reference light 200 has been preset to the incident angle adapted to reproduce the page data of the ith page. The page data of the ith page is reproduced by the image pickup device 24. During the reproduction of the page data of the ith page, the control light 300 is set to such an incident angle that the diffracted light is generated from the hologram corresponding to the page data of the (i+1)th page. Such an incident angle is scanned within a predetermined range. The diffracted light 600 of the control light 300 is detected by the photodetector 50 and the incident angle at which the intensity of the diffracted light becomes the peak value as shown in FIG. 7 is detected. Since this incident angle is an incident angle suitable to reproduce the page data of the (i+1)th page, the incident angle of the reference light 200 adapted to reproduce the page data of the (i+1)th page is preliminarily obtained in this manner.

Figure 8:
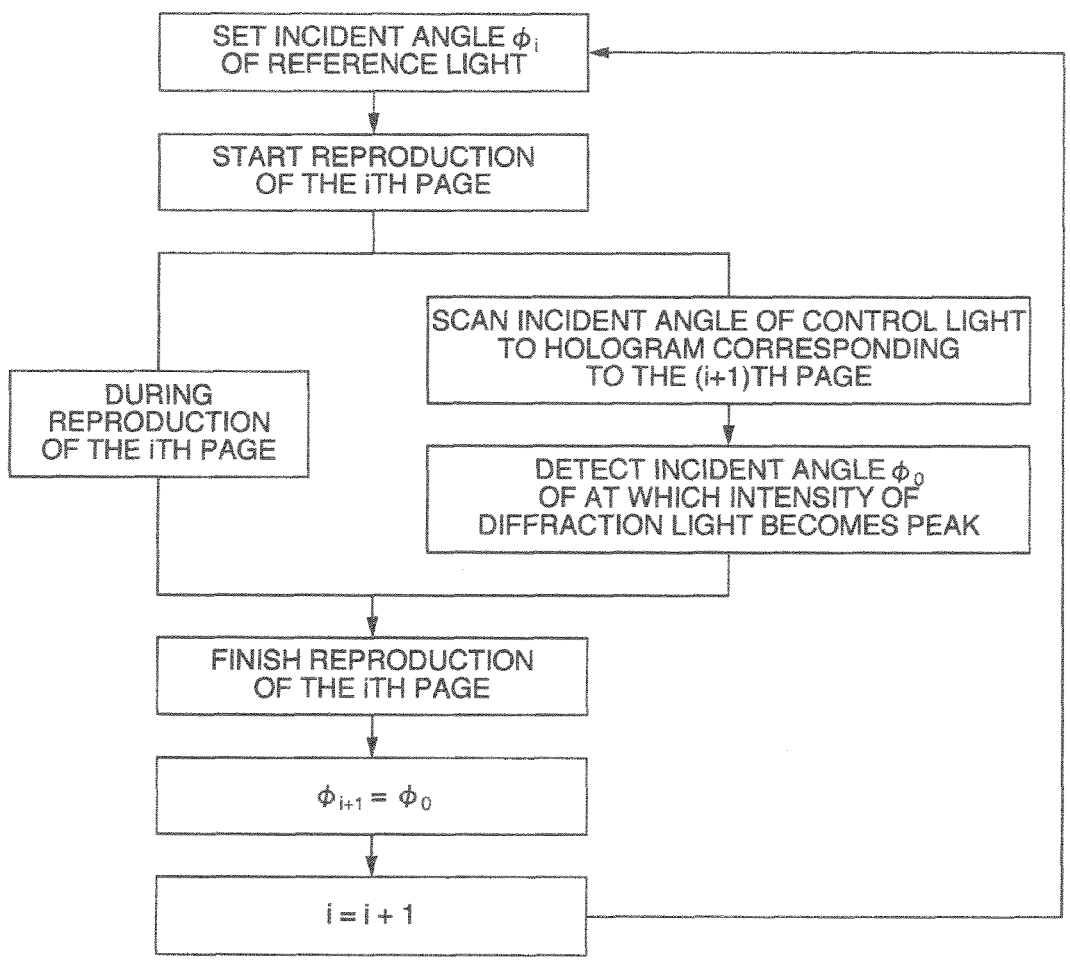
FIG. 8 is a flowchart for detecting a value of the proper incident angle.

The foregoing series of operation is collectively shown in a flowchart of FIG. 8. First, in order to reproduce the page data of the ith page, the incident angle of the reference light 200 is set to $\phi_i$. The reproduction of the page data of the ith page is started and during the reproduction, the incident angle of the control light 300 is scanned to the hologram corresponding to the page data of the (i+1)th page. The incident angle $\phi_0$ at which the intensity of the diffracted light becomes the peak value is detected. That is, the incident angle of the reference light 200 suitable to reproduce the page data of the (i+1)th page is preliminarily obtained. The reproduction of the page data of the ith page is finished and the detected $\phi_0$ is set as an incident angle $\phi_{i+1}$ of the reference light corresponding to the (i+1)th page which is subsequently reproduced. The reproduction of the page data of the (i+1)th page is started and this operation is repeated.

In the embodiment, during the reproduction of the page data, the incident angle of the reference light 200 which is set when subsequent page data is reproduced is preliminarily detected. However, according to the invention, the page data which is reproduced is not limited to the subsequent page data but the incident angle of the reference light 200 which is set when the page data is reproduced can be preliminarily detected by using the foregoing method so long as it is page data of such as two- or three pages after the current page which will be reproduced from now on.

In the embodiment mentioned above, during the reproduction of the page data, in parallel with it, the proper incident angle is previously detected to the hologram which is subsequently reproduced. Therefore, a high transfer speed can be realized while raising the reproduction quality.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A reproduction method of reproducing information from a hologram recording medium in which page data has been recorded as an interference pattern, comprising the steps of:
emitting a laser light;
generating a reference light from the laser light;
generating a control light whose polarizing direction differs from that of the reference light, the control light being separated from the reference light;
irradiating the control light to the hologram recording medium at a plurality of angles;
detecting diffracted light which are caused by the irradiation of the control light;
determining an irradiation angle of the reference light on the basis of the detected diffracted light; and
reproducing the information recorded in the hologram recording medium by using the reference light with the determined irradiation angle, wherein:
the irradiation angle of the reference light and the control light are controlled independently from each other, during a reproduction of first page data, the control light is irradiated to the hologram recording medium and is scanned in an irradiation angle range of the control light corresponding to second page data detect proper irradiation angle of the reference light for the second page data in advance, the second page data being different from the first page data and being subsequently reproduced after the first page, and to control the irradiation angle of the reference light corresponding to the second page data is determined based on a result of detecting proper irradiation angle of the reference light for the second page data, the second page data being reproduced using the determined irradiation angle of the reference light for the second page data after the reproduction of first page data, and
the first page data and the second page data are angularly multiplexed in a same location of the hologram recording medium with different irradiation angle.

2. The method according to claim 1, wherein when page data of an ith page which has been recorded at an incident angle $\theta_i$ of the reference light is reproduced, a width of a scanning range where an incident angle of the control light is changed is smaller than $|\theta_{i-1}-\theta_{i+1}|$, where $\theta_{i-1}$ and $\theta_{i+1}$ are incident angles of the reference light at an (i−1)th page and an (i+1)th page respectively.

3. The method according to claim 1, wherein
control of the irradiation angle of the reference light is made in a first incident angle scanning unit,
control of the irradiation angle of the control light is made in a second incident angle scanning unit, and
an angle scanning range of the second incident angle scanning unit is smaller than an angle scanning range of the first incident angle scanning unit.

4. The method according to claim 3, wherein a scanning speed of the second incident angle scanning unit is higher than a scanning speed of the first incident angle scanning unit.

5. The method according to claim 4, wherein the second incident angle scanning unit is constructed by one of a piezo element, an acousto-optical scanner element, and an electro-optical scanner element and a reflecting mirror.

6. The method according to claim 1, wherein the detection of the diffracted light is performed by a photodiode.

7. The method according to claim 1, wherein the polarizing direction of the control light and the polarizing direction of the reference light cross perpendicularly each other.

8. A reproduction apparatus for reproducing information recorded in a hologram recording medium in which page data has been recorded as an interference pattern, comprising:
a laser light source for emitting a laser light;
a first beam splitter for generating a reference light from the laser light;
a second beam splitter for generating a control light whose polarizing direction differs from that of the reference light, the control light being separated from the reference light;
a first incident angle scanning unit for scanning an angle scanning range of an incident angle of the reference light;
a second incident angle scanning unit for scanning an angle scanning range of an incident angle of the control light; and
a photodetecting unit for detecting diffracted light from the hologram recording medium, the diffracted light being caused by changing the incident angle of the control light by the second incident angle scanning unit and irradiating the control light to the hologram recording medium, wherein:
the irradiation angle of the reference light and the control light are controlled independently from each other,
during a reproduction of first page data, the control light is irradiated to the hologram recording medium and is scanned in an irradiation angle range of the control light corresponding to second page data detect proper irradiation angle of the reference light for the second page data in advance, the second page data being different from the first page data and being subsequently reproduced after the first page and the irradiation angle of the reference light corresponding to the second page data is determined based on a result of detecting proper irradiation angle of the reference light for the second page data, the second page data being reproduced using the controlled irradiation angle of the reference light for the second page data after the reproduction of first page data, and
the first page data and the second page data are angularly multiplexed in a same location of the hologram recording medium with different irradiation angle.

9. The apparatus according to claim 8, wherein when page data of an ith page which has been recorded at an incident angle $\theta_i$ of the reference light is reproduced, a width of a scanning range where an incident angle of the control light is changed is smaller than $|\theta_{i-1}-\theta_{i+1}|$, where $\theta_{i-1}$ and $\theta_{i+1}$ are incident angles of the reference light at an (i−1)th page and an (i+1)th page respectively.

10. The apparatus according to claim 8, wherein an angle scanning range of the second incident angle scanning unit is smaller than an angle scanning range of the first incident angle scanning unit.

11. The apparatus according to claim 8, wherein a scanning speed of the second incident angle scanning unit is higher than a scanning speed of the first incident angle scanning unit.

12. The apparatus according to claim 8, wherein the second incident angle scanning unit is constructed by one of a piezo element, an acousto-optical scanner element, and an electro-optical scanner element and a reflecting mirror.

13. The apparatus according to claim 8, wherein the photodetecting unit is a photodiode.

14. The apparatus according to claim 8, further comprising a space light modulator obtained by two-dimensionally arranging pixels for generating signal light having information of the page data which is constructed by a bright portion and a dark portion and has been two-dimensionally modulated, and wherein assuming that a setting of the pixel corresponding to the bright portion is ON and a setting of the pixel corresponding to the dark portion is OFF, the number of pixels which are set to ON upon reproduction is larger than the number of pixels which are set to ON upon recording.

15. The apparatus according to claim 8, wherein the polarizing direction of the light beam and the polarizing direction of the reference light cross perpendicularly each other.

16. The apparatus according to claim 8, further comprising a control unit for controlling the first incident angle scanning unit on the basis of a light amount of the photodetecting unit, and
wherein the reference light is irradiated to the hologram recording medium by the controlled first incident angle scanning unit, thereby reproducing the information.

17. A reproduction method of reproducing information from a hologram recording medium in which page data has been recorded as an interference pattern, comprising the steps of:
emitting a laser light;
generating a reference light from the laser light;
generating a control light whose polarizing direction differs from that of the reference light, the control light being separated from the reference light;
irradiating the control light to the hologram recording medium at a plurality of angles;
detecting diffracted light which are caused by the irradiation of the control light;
determining an irradiation angle of the reference light on the basis of the detected diffracted light; and
reproducing the information recorded in the hologram recording medium by using the reference light with the determined irradiation angle, wherein:
the irradiation angle of the reference light and the control light are controlled independently from each other,
control of the irradiation angle of the reference light is made in a first incident angle scanning unit,
control of the irradiation angle of the control light is made in a second incident angle scanning unit to detect proper irradiation angle of the reference light for a second page data in advance, the second page data being subsequently reproduced after a first page and being different from the first page data,
an angle scanning range of the second incident angle scanning unit is smaller than an angle scanning range of the first incident angle scanning unit,
the irradiation angle of the reference light corresponding to the second page data is determined based on a result of detecting proper irradiation angle of the reference light for the second page data, the second page data being reproduced using the controlled irradiation angle of the reference light for the second page data after the reproduction of first page data, and
the first page data and the second page data are angularly multiplexed in a same location of the hologram recording medium with different irradiation angle.

* * * * *